D. MOORE.
DUST TROUGH AND DUST TROUGH CLEANER.
APPLICATION FILED MAY 12, 1913.

1,175,285.

Patented Mar. 14, 1916.

Witnesses.
L. A. Paley
A. G. Hague

Inventor.
David Moore
by Craig & Bair Atty's

THE COLUMBIA PLANOGRAPH CO., WASHINGTON, D. C.

UNITED STATES PATENT OFFICE.

DAVID MOORE, OF PERRY, IOWA.

DUST-TROUGH AND DUST-TROUGH CLEANER.

1,175,285. Specification of Letters Patent. Patented Mar. 14, 1916.

Application filed May 12, 1913. Serial No. 767,222.

*To all whom it may concern:*

Be it known that I, DAVID MOORE, a citizen of the United States, and resident of Perry, in the county of Dallas and State of Iowa, have invented a certain new and useful Dust-Trough and Dust-Trough Cleaner, of which the following is a specification.

The object of my invention is to provide a dust trough of simple, durable and inexpensive construction, provided with inclined sides, and with a dust receptacle having a restricted upper opening.

A further object is to provide a dust trough of this kind having a receptacle provided with openings in its lower side and with adjustable means for closing said openings and with a swab for cleaning said receptacle and having a handle extended through said opening.

My invention consists in certain details, in the construction, combination and arrangement of the various parts of the device, whereby the objects contemplated are attained, as hereinafter more fully set forth, pointed out in my claim and illustrated in the accompanying drawings, in which—

Figure 1:
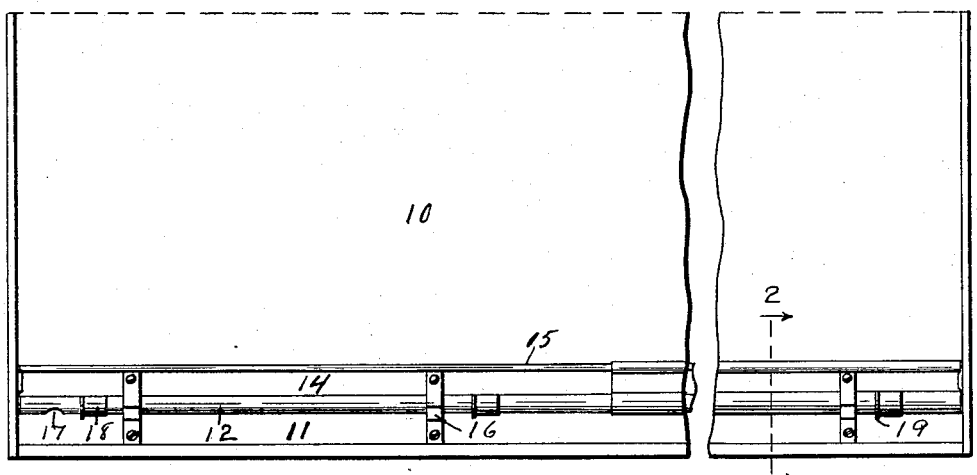
Figure 3:
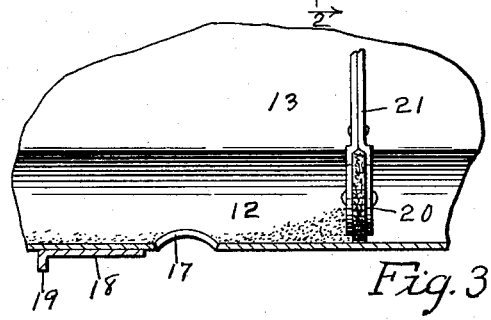
Figure 2:
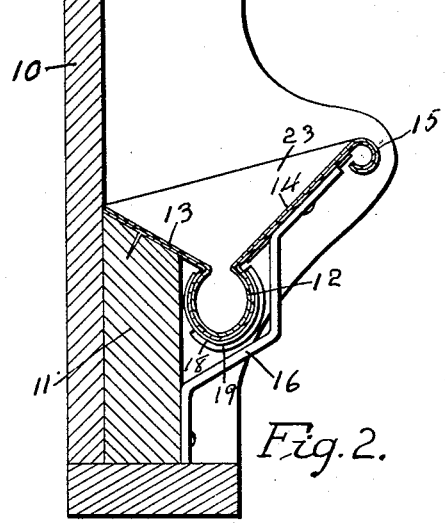
Figure 4:
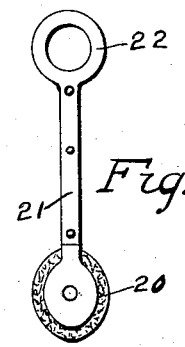

Figure 1 shows a front elevation of a dust trough embodying my invention. Fig. 2 shows a sectional view of the said dust board and a portion of the wall, taken on the line 2—2 of Fig. 1. Fig. 3 shows a detail, longitudinal, vertical, sectional view through a portion of my dust trough, and Fig. 4 shows a detail view of my improved swab or cleaning device.

In the accompanying drawings, I have used the reference numeral 10 to indicate generally the black board to which my improved dust trough is secured. I preferably provide a board or the like 11 having its upper edge inclined downwardly and away from the black board 10, as clearly shown in Fig. 2. My improved dust trough is preferably made in sections of suitable length. Each section, I preferably make from a single piece of sheet metal or the like, bent to form a cylinder 12, having a narrow longitudinal opening at its upper side and having inclined walls 13 and 14 extending upwardly and away from said opening, as clearly shown in Fig. 2. The wall 13 is designed to rest upon the inclined upper surface of the board 11, and to be secured thereto in any suitable manner. The outer edge of the wall 14 is preferably bent or curved into a small cylinder 15. Suitable brackets 16 may be placed at regular intervals and secured to the wall 14 and board 11 by means of screws or the like.

It will be seen that the walls 13 and 14 form a trough for supporting erasers and crayon. The opening in the upper side of the cylinder 12 is sufficiently narrow to prevent the crayon from dropping downwardly into said cylinder. One end of each section of my improved dust trough is preferably somewhat contracted and the other end is preferably somewhat enlarged so that the adjacent ends of succeeding sections may be telescoped, as shown in Fig. 1.

In the bottom of the receptacle formed by the cylinder 12 I provide, at certain intervals, openings 17. Mounted on the cylinder 12 are sliding covers 18 designed in one position of their movement to cover the respective openings 17. Each of the covers 18 is provided with a downwardly extending flange 19 for conveniently sliding the covers. Received within the cylinder 12 is a swab or cleaning device 20, having a handle 21 which extends upwardly through the opening in the upper side of said cylinder, and has at its upper end an enlarged portion 22 which may be too large to pass through said opening.

In the practical use of my improved dust board, the dust will gradually drift down the inclined walls 13 and 14 and drop into the cylinder 12. The narrow opening at the upper side of said cylinder prevents the entrance of crayon or erasers, which do not lie in a trough full of dust. When the caretaker desires to clean the dust trough, the dust is all brushed into the cylinder 12. The upper opening 17 is uncovered by moving the slide 18 and the swab 20 is moved along the dust trough until the dust is discharged through the opening 17. I preferably provide end walls 23, of suitable construction for closing the ends of my trough.

Where my improved dust trough is used, the dust collects in the cylinder 16 and will not be readily blown about the room to soil clothing and be in the air breathed by the occupants. It is, therefore, far cleaner and more sanitary than the ordinary dust, crayon and eraser trough. At the same time my trough may be more quickly and easily cleaned than the ordinary trough and this can be done with a minimum disturbance of the dust in the trough. A pail can be held under the discharge opening 17 and very little dust will fly about the room.

It will be understood that changes may be made in the details of the construction of my dust trough and it is my intention to cover by this application any variations in construction which may be included within the scope of the following claim.

I claim as my invention:

In a dust trough and cleaner, the combination of a plurality of dust troughs having a cylinder formed with a narrow, longitudinal opening in its upper side, and having a portion extending upwardly and rearwardly from said opening and a portion extending upwardly and forwardly from the opposite side of the opening, said dust troughs being larger at one end than the other to permit them to telescope, the cylindrical portions of said dust trough being provided with openings in their sides, cover members curved to form more than a half cylinder slidably mounted on said cylindrical portions and having downwardly extending handle members on said cylindrical portions, and a swab having a cleaning portion received within said cylinder of a size too large to pass through said longitudinal opening, and having a handle extending from the opening, and an enlarged portion on the outer end of the handle to prevent the handle from dropping into the cylinder.

Des Moines, Iowa, April 25, 1913.

DAVID MOORE.

Witnesses:
M. WALLACE,
S. ROBINSON.

Copies of this patent may be obtained for five cents each, by addressing the "Commissioner of Patents, Washington, D. C."